No. 809,945. PATENTED JAN. 16, 1906.
M. HEMLEB.
FEED REGULATING DEVICE FOR SEWING MACHINES.
APPLICATION FILED JUNE 12, 1905.
2 SHEETS—SHEET 1.
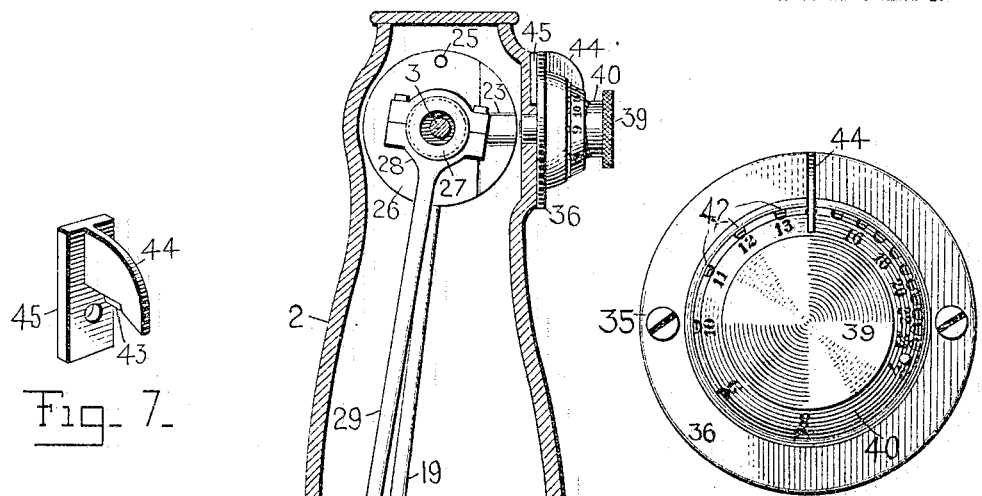

No. 809,945. PATENTED JAN. 16, 1906.
M. HEMLEB.
FEED REGULATING DEVICE FOR SEWING MACHINES.
APPLICATION FILED JUNE 12, 1905.
2 SHEETS—SHEET 2.
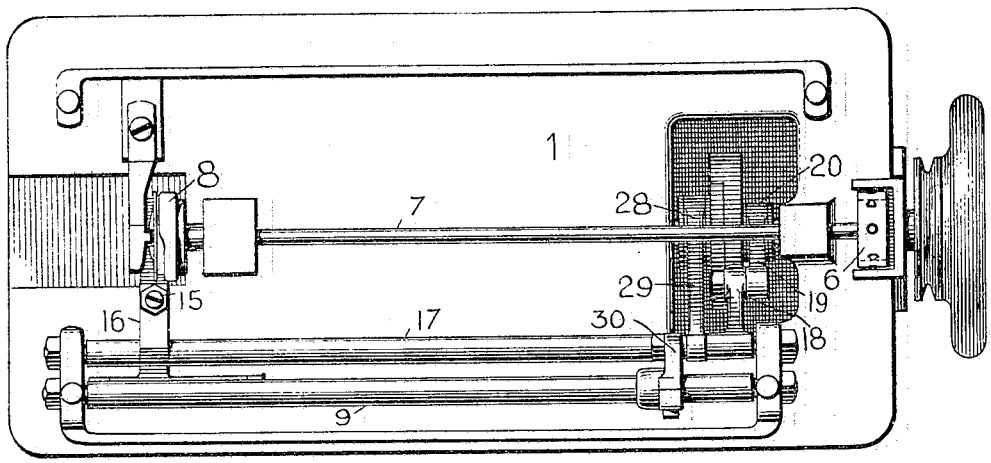
Fig-3-
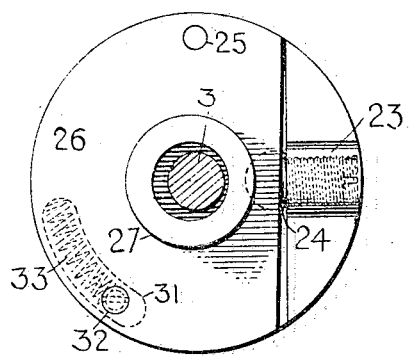
Fig-8-
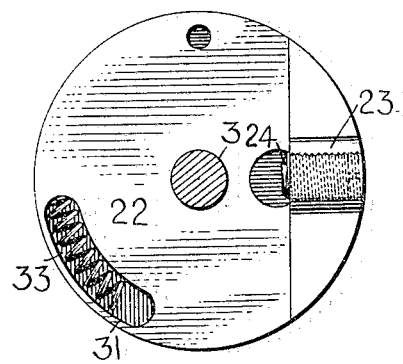
Fig-10-
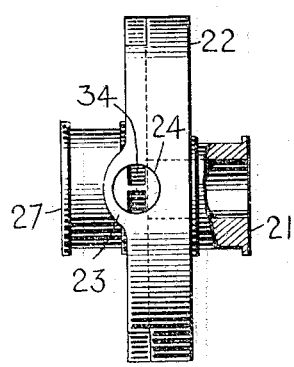
Fig-9-
Witnesses
Inventor
Martin Hemleb,
By his Attorney
Henry J. Miller

UNITED STATES PATENT OFFICE.

MARTIN HEMLEB, OF ELIZABETH, NEW JERSEY, ASSIGNOR TO THE SINGER MANUFACTURING COMPANY, A CORPORATION OF NEW JERSEY.

FEED-REGULATING DEVICE FOR SEWING-MACHINES.

No. 809,945. Specification of Letters Patent. Patented Jan. 16, 1906.

Application filed June 12, 1905. Serial No. 264,770.

*To all whom it may concern:*

Be it known that I, MARTIN HEMLEB, a citizen of the United States, residing at Elizabeth, in the county of Union and State of New Jersey, have invented certain new and useful Improvements in Feed-Regulating Devices for Sewing-Machines, of which the following is a specification, reference being had therein to the accompanying drawings.

This invention relates to an improvement in regulating devices for controlling the action of the feeding mechanism in sewing-machines, and has for its object to provide simple and effective means to this end.

The improvement is designed particularly for application to that class of sewing-machines constructed with a frame comprising a bed-plate and overhanging bracket-arm in which is journaled a rotary main shaft having the usual crank-and-pitman connection with the needle-bar and provided with four-motioned feeding mechanism including feed-lifting and feed-actuating rock-shafts beneath the bed-plate deriving their movements through independent connections with cranks or eccentrics upon the main shaft and housed within the upright columnar portion of the bracket-arm.

In the preferred embodiment of the improvement the main shaft has fixed thereon a collar provided with the feed-lifting eccentric and a disk having a laterally-projecting portion carrying an adjusting-screw adapted to engage the edge of a second disk pivoted to the fixed disk and provided with a hollow laterally-projecting boss encircling the main shaft and constituting the feed-lifting eccentric, the fixed disk being provided with a segmental recess, between one end of which and a stud projecting therein from the pivoted disk is interposed a spring to maintain the latter in contact with the end of the adjusting-screw.

To one side of the bracket-arm and in line with the fixed disk carrying the adjusting-screw is disposed a rotary operating-spindle mounted in a fixed bearing and provided with a flattened inner extremity adapted to fit a corresponding notch or recess in the adjusting-screw when the main shaft is turned to bring such parts into register. The operating-spindle is provided with a peripherally-notched and graduated head whose notches are adapted to engage successively a longitudinal tooth formed upon an outwardly-projecting pointer-finger coöperating with the graduations of the spindle-head to indicate the position of the operative portion of the spindle and with the peripheral notches to prevent the turning of the same when in inoperative or retracted position, the spindle being pressed normally out of operative relation with the feed-eccentric adjusting-screw by means of a spring and being incapable of engaging the adjusting-screw until the same is brought into register therewith.

In the drawings annexed, in which the improvement is represented as embodied in a Singer revolving-hook sewing-machine, Figure 1 is a front end elevation of the lower portion of the machine, and Fig. 2 a vertical transverse section through the rear portion of the bracket-arm to show the connections between the main shaft and the feed lifting and actuating rock-shafts. Fig. 3 is a plan view of the under side of the machine. Fig. 4 is a detached external elevation of the actuating device for the adjusting-screw; Fig. 5, a transverse section of the same in operative relation with the adjusting-screw, and Fig. 6 a similar view of said parts in inoperative relation. Fig. 7 is a perspective view of the pointer-finger and its attachment-plate. Fig. 8 is a side view, and Fig. 9 an edge view, of the feed-actuating eccentric and its adjusting devices; and Fig. 10, an inner side view of the fixed disk carrying the adjusting-screw and spring for controlling the position of the pivoted disk.

The machine is provided with a frame constructed with the usual bed-plate 1 and bracket-arm 2, in which latter is journaled the driving-shaft 3, which is in practice connected at its forward end with the needle-bar 4, carrying the needle 5, and is connected at its rearward end by means of suitable pin-wheels and flexible belt 6 with the hook-shaft 7, carrying at its forward end the loop-taking hook 8, coöperating with the needle 5. In suitable bearings beneath the bed-plate is mounted the usual feed rock-shaft 9, provided at its forward end with the crank-arms 10, between which is pivoted at 11 one end of the feed-bar 12, carrying at its opposite end the feed-dog 13, adjacent which in its lower side it is provided with a ball-socket entered by the rounded upper end of an upright rod 14, whose rounded lower end rests within a ball-socket formed in the upper end of a bearing-screw 15, carried by the outer end of a lateral crank-arm 16 upon the forward end of the feed-lifting rock-shaft 17, whose rear end is provided with a lateral crank-arm 18, pivotally connected with the lower end of a rod 19, having at its upper end a strap 20, embracing the feed-lifting eccentric formed upon a fixed collar 21 upon the rearward portion of the main shaft. The crank-arm 16 and feed-bar 12 are connected adjacent the rod 14 by means of a spring 14ª, serving to maintain the ball-shaped extremities of the rod 14 seated in their sockets in the parts connected thereby. The fixed collar 21 is provided with a disk 22, having upon one side an internally-threaded boss 23, to which is fitted the adjusting-screw 24. The fixed disk 22 is provided near one edge with the screw-pin 25, upon which is pivoted at a corresponding point a segment-shaped disk 26, provided with a hollow lateral boss 27, having a bore considerably exceeding the diameter of the main shaft 3 and constituting the feed-eccentric, which is embraced by the strap 28, provided at the upper end of a connecting-rod 29, attached at the lower end to a lateral arm 30 of the feed-actuating rock-shaft 9. The fixed disk 22 is provided with a segmental recess 31, between one end of which and the screw-stud 32, projecting into the same from the inner face of the disk 26, is interposed a spring 33, adapted to press the adjacent edge of the disk 26 into engagement with the inner end of the adjusting-screw 24. It is evident that by turning the adjusting-screw 24 by the introduction of a suitable implement into the transversely-slotted and cross-barred outer end 34 of the same the feed-eccentric 27 may be shifted laterally to vary its eccentricity in respect of the supporting-shaft 3 in a manner well-known.

The upper portion of the bracket-arm adjacent the disk 22 is provided with an aperture radially disposed in respect of the shaft 3 and surrounded by a suitable seat upon which is secured by screws 35 a circular supporting-plate 36, having a perforated central boss 37, constituting a bearing for the rotary spindle 38, having its inner operative end flattened and transversely slotted to fit the correspondingly-shaped outer end of the adjusting-screw 24 and provided at its outer end with a head formed with a knob 39 and with an internally-recessed hub 40, between which and the plate 36 is interposed the spring 41, adapted to normally withdraw the spindle from operative relation with the adjusting-screw 24. The hub 40 is formed adjacent the plate 36 as a dial with a series of peripheral graduations formed by notches 42, adapted to successively embrace a longitudinal tooth 43, formed upon the adjacent edge of a pointer-finger 44, having an attachment-plate 45 secured to the inner side of the plate 36 by means of the screw 46. The outer end of the finger 44 somewhat overhangs the adjacent portion of the hub 40 and serves as a stop in conjunction therewith to limit the outward movement of the operating-spindle 38 under the action of the spring 41.

The collar 21 is set in such position upon the main shaft 3 that the adjusting-screw 24 will come into register with the operating-spindle 38 only when the needle-bar is in its highest position with the needle out of the goods, and the position and length of the tooth 43 is such that its engagement with one of the peripheral notches 42 of the spindle-head is interrupted only when the latter is pressed inwardly in opposition to the spring 41 and the operating end of the spindle 38 has entered the notch in the adjacent end of the adjusting-screw 24. It is therefore evident that while the eccentric adjusting mechanism moves with the main shaft entirely independently of the spindle by which it is operated the former is wholly incapable of operation independently of the operating-spindle 38, while the latter is positively locked from movement excepting when in operative relation with the adjusting-screw, and that notwithstanding their disconnection in the running of the machine when performing its normal function each of such parts of the mechanism is compelled to maintain a fixed relation with the other corresponding with the reading of the dial upon the head of the spindle, which thus indicates under all conditions the number of stitches per inch for the production of which the feeding mechanism is set.

By providing for the operative engagement of the inner end of the tooth 43 upon the finger 44, with the edge of the dial excepting at the notched graduations of the latter through which such tooth is permitted to pass in the movement of the spindle 38 under the action of its retracting-spring 41, it is evident that such end of the tooth 43 forms a positive stop which effectively prevents the disengagement of the spindle 38 from the adjusting-screw 24 excepting when the former is so turned that one of its notches registers with the tooth 43, and therefore the present improvement insures the setting of the feed-eccentric under all circumstances in a position corresponding with a whole number of stitches per inch or to such other length of feed as the dial may be constructed to provide for.

Having thus set forth the nature of the invention, what I claim herein is—

1. In a feeding mechanism for sewing-machines, the combination with a rotary shaft, a transversely-adjustable feed-actuating eccentric mounted upon said shaft, a rock-shaft, a connecting-rod intermediate said eccentric and rock-shaft, adjusting means applied to and adapted to rotate with said eccentric for shifting the same transversely of its supporting-shaft, and a rotary operating device disposed at one side of said shaft and normally disconnected from the adjusting means of said eccentric but adapted to engage the same for varying the eccentricity of said eccentric laterally upon its supporting-shaft.

2. In a feeding mechanism for sewing-machines, the combination with a rotary shaft, a transversely-adjustable feed-actuating eccentric mounted upon said shaft, a rock-shaft, a connecting-rod intermediate said eccentric and rock-shaft, adjusting means applied to and adapted to rotate with said eccentric for shifting the same transversely of its supporting-shaft, an endwise-movable rotary spindle disposed radially at one side of said shaft and adapted for operative engagement with the adjusting means of said eccentric, means for maintaining said spindle normally retracted from operative relation with said adjusting means, and a locking device for preventing the rotation of said spindle in retracted position.

3. In a feeding mechanism for sewing-machines, the combination with a rotary shaft, a collar fixed thereon, a feed-eccentric movably mounted on said fixed collar, an adjusting-screw for determining the lateral position of said eccentric in relation to its supporting-collar, an endwise-movable rotary spindle mounted in a fixed support and adapted to register with said adjusting-screw and operatively engage the same for turning it, and means for preventing the disengagement of said spindle from the adjusting-screw excepting in certain predetermined axial positions of the same.

4. In a feeding mechanism for sewing-machines, the combination with a rotary shaft, a collar fixed thereon, a feed-eccentric movably mounted on said fixed collar, an adjusting-screw for determining the lateral position of said eccentric in relation to its supporting-collar, an endwise-movable rotary spindle mounted in a fixed support and adapted to register with said adjusting-screw and operatively engage the same for turning it, a dial carried by said spindle and a stationary pointer coöperating therewith, and means for preventing the disengagement of said spindle from the adjusting-screw intermediate the graduations of said dial.

5. In a feeding mechanism for sewing-machines, the combination with a rotary shaft, a collar fixed thereon, a feed-eccentric movably mounted on said fixed collar, an adjusting-screw for determining the lateral position of said eccentric in relation to its supporting-collar, an endwise-movable rotary spindle mounted in a fixed support and adapted to register with said adjusting-screw and operatively engage the same for turning it, a dial carried by said spindle and provided with a series of peripheral notches, and a stationary pointer-finger coöperating with said dial and provided with a tooth adapted to enter one of said peripheral notches in the dial in the retracted position of said spindle from operative relation with said adjusting-screw but to permit said dial to be rotated freely for the rotation of said adjusting-screw by said spindle.

6. In a feeding mechanism for sewing-machines, the combination with a rotary shaft, a collar fixed thereon, a feed-eccentric movably mounted on said fixed collar, an adjusting-screw for determining the lateral position of said eccentric in relation to its supporting-collar, an endwise-movable rotary spindle mounted in a fixed support and adapted to register with said adjusting-screw and operatively engage the same for turning it, a spring for maintaining said spindle normally retracted from operative engagement with said adjusting-screw, a dial carried by said spindle, and a stationary pointer-finger coöperating with said dial in indicating the axial position of said spindle and provided with a stop-shoulder for operatively engaging said dial to limit the movement of said spindle under the action of its retracting-spring.

In testimony whereof I have signed my name to this specification in the presence of two subscribing witnesses.

MARTIN HEMLEB.

Witnesses:
 HENRY J. MILLER,
 HENRY A. KORNEMANN.